(12) United States Patent
Lee et al.

(10) Patent No.: US 11,477,716 B2
(45) Date of Patent: Oct. 18, 2022

(54) METHOD FOR ESTIMATING MOBILITY STATE OF UE AND DEVICE SUPPORTING THE SAME

(71) Applicant: LG ELECTRONICS INC., Seoul (KR)

(72) Inventors: Yejee Lee, Seoul (KR); Hongsuk Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 16/954,189

(22) PCT Filed: Feb. 7, 2019

(86) PCT No.: PCT/KR2019/001507
§ 371 (c)(1),
(2) Date: Jun. 15, 2020

(87) PCT Pub. No.: WO2019/160268
PCT Pub. Date: Aug. 22, 2019

(65) Prior Publication Data
US 2021/0168691 A1   Jun. 3, 2021

Related U.S. Application Data

(60) Provisional application No. 62/630,250, filed on Feb. 14, 2018.

(51) Int. Cl.
*H04W 36/32* (2009.01)
*H04W 36/00* (2009.01)
*B64C 39/02* (2006.01)

(52) U.S. Cl.
CPC ......... *H04W 36/32* (2013.01); *B64C 39/024* (2013.01); *H04W 36/0061* (2013.01); *H04W 36/00835* (2018.08)

(58) Field of Classification Search
CPC ............ H04W 36/32; H04W 36/0061; H04W 36/00835; H04W 60/00; B64C 39/024
See application file for complete search history.

(56) References Cited

U.S. PATENT DOCUMENTS 10,932,225 B2 * 2/2021 Yang ................. H04W 36/0083
2014/0206357 A1 * 7/2014 Lu ........................ H04W 64/00
455/436

(Continued)

OTHER PUBLICATIONS

PCT International Application No. PCT/KR2019/001507, International Search Report dated May 22, 2019, 2 pages.

(Continued)

*Primary Examiner* — Charles N Appiah
*Assistant Examiner* — Frank E Donado
(74) *Attorney, Agent, or Firm* — Lee Hong Degerman Kang Waimey

(57) ABSTRACT

Provided are a method of estimating mobility state of UE and a device supporting the method. According to one embodiment of the present disclosure, the method includes: receiving information on neighbor cell from a serving cell, wherein the information informs to which group the neighbor cell belongs; performing cell change from the serving cell to the neighbor cell; when the neighbor cell belongs to a first group, counting the cell change; when the neighbor cell belongs to a second group, skipping counting the cell change; and reporting a number of counted cell change for estimating mobility state of the UE, wherein the first group and the second group are configured based on altitude of the UE.

10 Claims, 16 Drawing Sheets

(56) References Cited

U.S. PATENT DOCUMENTS

| | | | |
|---|---|---|---|
| 2015/0072706 A1* | 3/2015 | Michaelsen | H04W 64/006 |
| | | | 455/456.1 |
| 2015/0078184 A1 | 3/2015 | Lee et al. | |
| 2017/0006512 A1* | 1/2017 | Hole | H04W 36/36 |
| 2020/0187033 A1* | 6/2020 | Tang | H04W 36/20 |
| 2020/0245215 A1* | 7/2020 | Han | H04W 8/22 |
| 2021/0144611 A1* | 5/2021 | Wigard | H04W 36/00837 |

OTHER PUBLICATIONS

Nokia et al., "Mobility enhancements for UAVs—planned rourte," 3GPP TSG-RAN WG2 #100, R2-1713264, Reno, USA, Nov. 27-Dec. 1, 2017, 5 pages.

Huawei et al., "DL enhancements for drones," 3GPP TSG RAN WG1 Meeting #91, R1-1719467, Reno, USA, Nov. 27-Dec. 1, 2017, 9 pages.

Sequans Communications, "DL interference mitigation for aerial vehicles," 3GPP TSG-RAN WG1 #91, R1-1720912, Reno, USA, Nov. 27-Dec. 1, 2017, 17 pages.

Fraunhofer HHI et al., "Handover enhancements for UAVs" 3GPP TSG-WG2 #100, R2-1712469, Reno, USA, Nov. 27-Dec. 1, 2017, 7 pages.

* cited by examiner

For ground UE

For aerial UE

For ground UE

For aerial UE

METHOD FOR ESTIMATING MOBILITY STATE OF UE AND DEVICE SUPPORTING THE SAME

CROSS-REFERENCE TO RELATED APPLICATIONS

This application is the National Stage filing under 35 U.S.C. 371 of International Application No. PCT/KR2019/001507, filed on Feb. 7, 2019, which claims the benefit of U.S. Provisional Application No. 62/630,250, filed on Feb. 14, 2018, the contents of which are all hereby incorporated by reference herein in their entirety.

TECHNICAL FIELD

The present invention relates to a wireless communication system, and more particularly, to a method for estimating mobility state of UE and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

In the LTE network, mobility state of a UE in idle mode is determined by number of cell reselections during recent time period. That is, the UE may determine its mobility state only based on the number of cell reselection. By the way, an aerial UE consider that more frequent handovers/reselections is performed, because neighbor cells are detected more densely at a high altitude.

SUMMARY

According to a prior art, normal speed aerial UE may be considered as higher speed due to frequent handover/reselection, so mobility estimation error may occur by applying wrong speed related parameters.

According to an embodiment of the present invention, a method performed by a user equipment (UE) in a wireless communication system is provided. The method may comprise: receiving information on neighbor cell from a serving cell, wherein the information informs to which group the neighbor cell belongs; performing cell change from the serving cell to the neighbor cell; when the neighbor cell belongs to a first group, counting the cell change; when the neighbor cell belongs to a second group, skipping counting the cell change; and reporting a number of counted cell change for estimating mobility state of the UE, wherein the first group and the second group are configured based on altitude of the UE.

The first group may be located closer to the serving cell than the second group.

The information may include a first tier value of the first group and a second tier value of the second group, and wherein the first tier value and the second tier value may be configured based on a distance from the serving cell.

The first tier value may be below a threshold, and the second tier value may be equal to or above the threshold.

The information may vary according to the altitude of the UE.

The method may further comprise: detecting the altitude of the UE; and determining whether the information is related with the altitude of the UE.

The detecting the altitude of the UE comprises:
measuring a number of neighbor cells; and
determining the altitude of the UE based on the number of neighbor cells.

According to an embodiment of the present invention, a user equipment (UE) in a wireless communication system is provided. The UE may comprise: a transceiver for transmitting or receiving a radio signal; and a processor coupled to the transceiver, the processor configured to: control the transceiver to receive information on neighbor cell from a serving cell, wherein the information informs to which group the neighbor cell belongs; perform cell change from the serving cell to the neighbor cell; when the neighbor cell belongs to a first group, count the cell change; when the neighbor cell belongs to a second group, skip counting the cell change; and report a number of counted cell change for estimating mobility state of the UE, wherein the first group and the second group are configured based on altitude of the UE.

The first group may be located closer to the serving cell than the second group.

The information may include a first tier value of the first group and a second tier value of the second group, and wherein the first tier value and the second tier value may be configured based on a distance from the serving cell.

The first tier value may be below a threshold, and the second tier value may be equal to or above the threshold.

The information may vary according to the altitude of the UE.

The processor may be further configured to: detect the altitude of the UE; and determine whether the information is related with the altitude of the UE.

The detecting the altitude of the UE may comprise: measuring a number of neighbor cells; and determining the altitude of the UE based on the number of neighbor cells.

According to embodiments of the present invention, the UE may estimate its mobility state precisely, by considering the altitude of the UE. Specifically, the UE may count cell change when the UE moves to another cell whose tier value is same to or bigger than a threshold.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
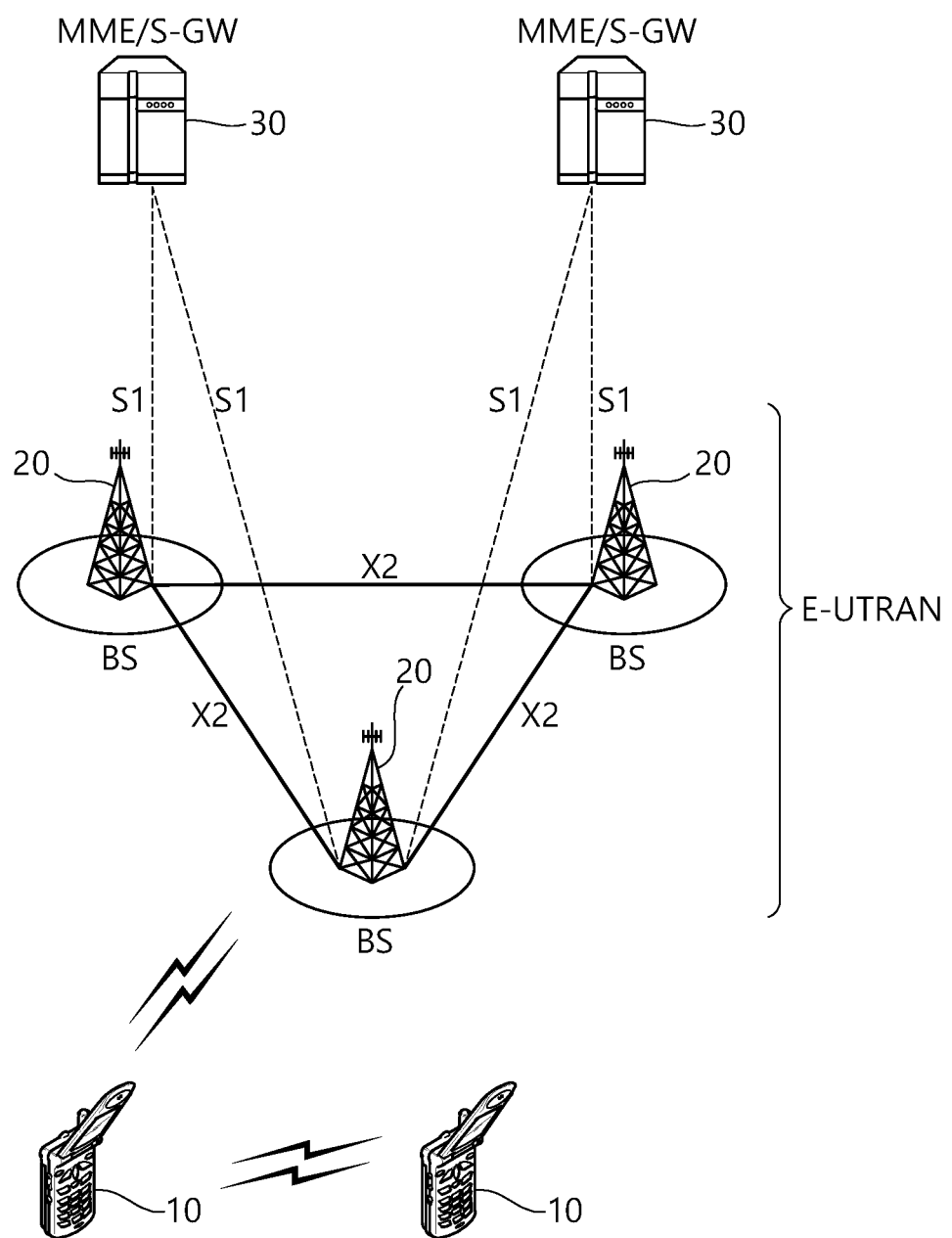
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
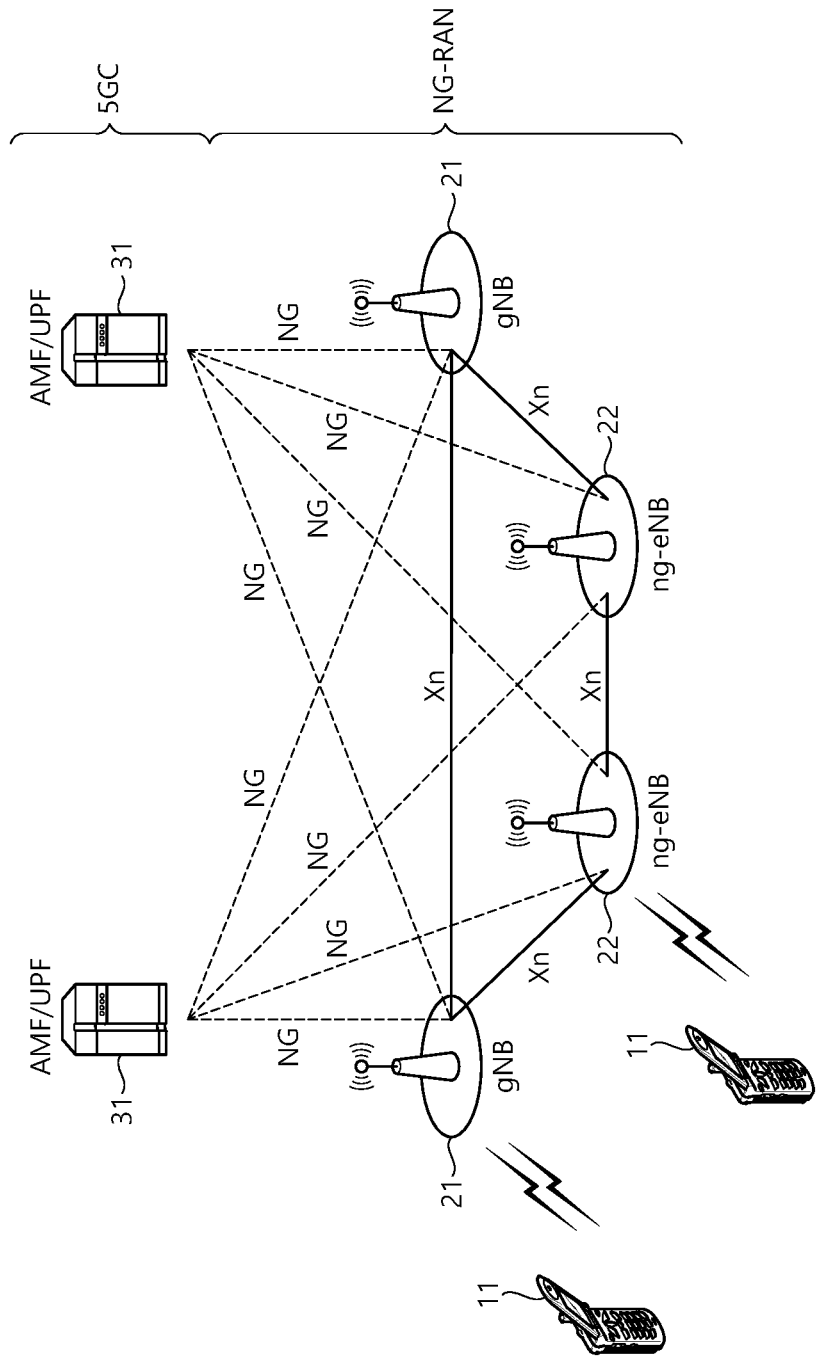
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
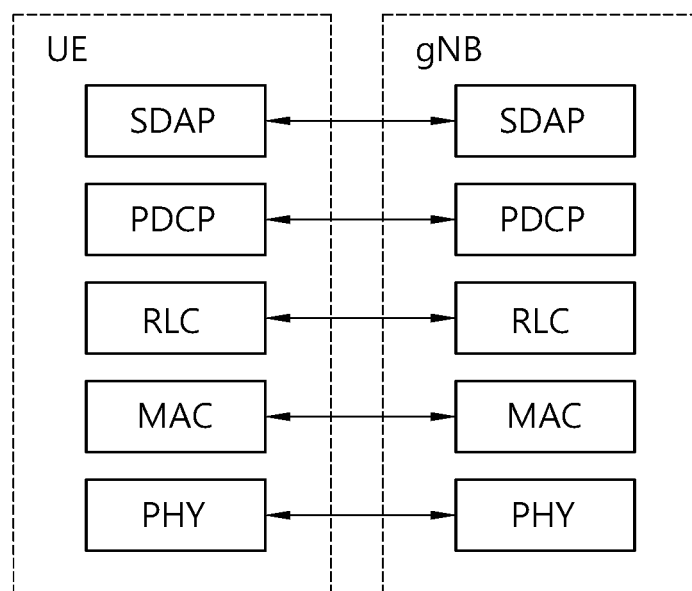
FIG. 3 shows a block diagram of a user plane protocol stack to which technical features of the present invention can be applied.
Figure 4:
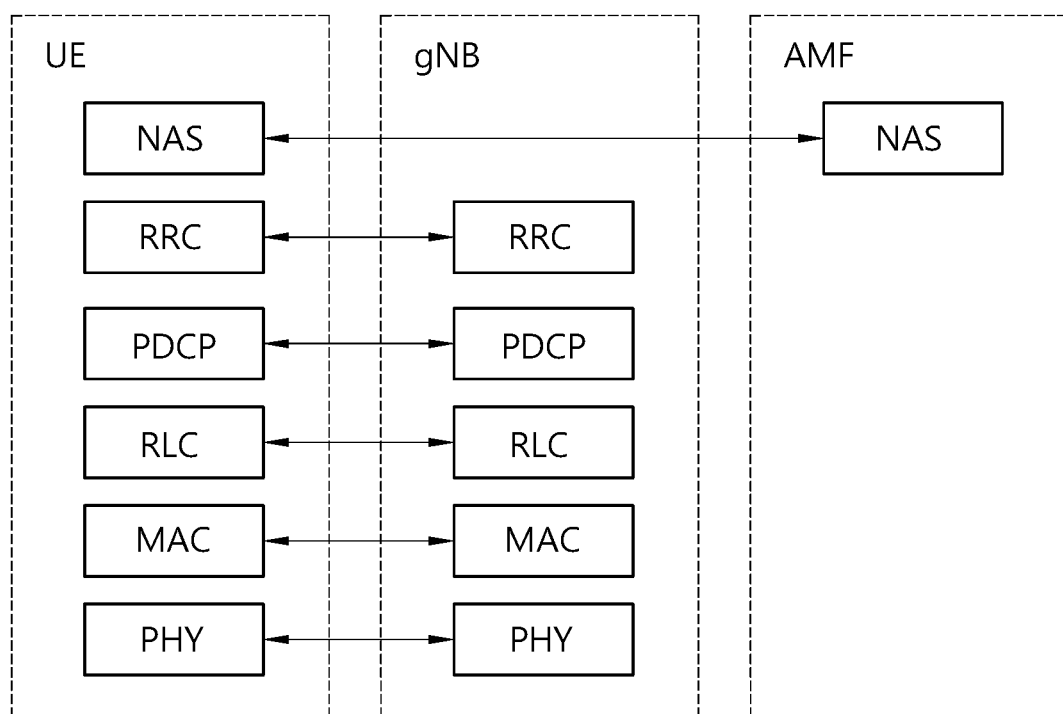
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, estimating mobility states of a UE is described.

Besides Normal-mobility state a High-mobility and a Medium-mobility state are applicable if the parameters ($T_{CRmax}$, $N_{CR\_H}$, $N_{CR\_M}$ and $T_{CRmaxHyst}$) are sent in the system information broadcast of the serving cell.

State detection criteria is classified into Medium-mobility state criteria and High-mobility state criteria.

Medium-Mobility State Criteria:
If number of cell reselections during time period $T_{CRmax}$ exceeds a neighbor cell reselection medium-mobility state count value $N_{CR\_M}$ and does not exceed a neighbor cell reselection high-mobility state count value $N_{CR\_H}$ High-Mobility State Criteria:
If number of cell reselections during time period $T_{CRmax}$ exceeds $N_{CR\_H}$ The UE shall not count consecutive reselections between same two cells into mobility state detection criteria if same cell is reselected just after one other reselection.

State transitions are described as follow.

The UE shall:
if the criteria for High-mobility state is detected, enter High-mobility state.
else if the criteria for Medium-mobility state is detected, enter Medium-mobility state.
else if criteria for either Medium- or High-mobility state is not detected during time period $T_{CRmaxHyst}$, enter Normal-mobility state.

If the UE is in High- or Medium-mobility state, the UE shall apply the speed dependent scaling rules.

Hereinafter, NB-IoT is described.

NB-IoT provides access to network services using physical layer optimized for very low power consumption (e.g. full carrier bandwidth is 180 kHz, subcarrier spacing can be 3.75 kHz or 15 kHz).

As indicated in the relevant subclauses in this specification, a number of E-UTRA protocol functions supported by all Rel-8 UEs are not used for NB-IoT and need not be supported by eNBs and UEs only using NB-IoT.

In this version of the specification, a number of functions including inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted MILAN interworking, sidelink communication/discovery, MDT, emergency call, CS fallback, self-configuration/self-optimisation, ACB, EAB, ACDC and SSAC are not supported for NB-IoT.

Recently, studies on aerial vehicle are tremendously progressed. In accordance with the enhancement of various functions for the aerial vehicles, it is required to precisely control and communicate with the aerial vehicle. In this description, the aerial vehicle may be referred as aerial UE.

Usually, the aerial UE performs frequent handovers/reselections in a high altitude. The mobility state of the aerial UE may be also estimated based on the number of handover or cell reselection in specific period of time. For example, the mobility state of the aerial UE is estimated to be high when the number of cell handovers/reselections during time period T exceeds N. Meanwhile, the number of detected cell at a low altitude may be different from the number of detected cell at a high altitude. Specifically, as an aerial UE moves upward, the number of detected cell may varies with the altitude of the aerial UE. For example, the aerial UE with higher altitude may consider that more handover procedure have performed than the aerial UE with lower altitude. Therefore, an aerial UE which is actually in normal speed may misunderstand as higher speed due to frequent handover/reselection. The estimation error may cause applying wrong speed related parameters. Therefore, enhanced MSE algorithm is needed for correcting UE speed.

Figure 5:
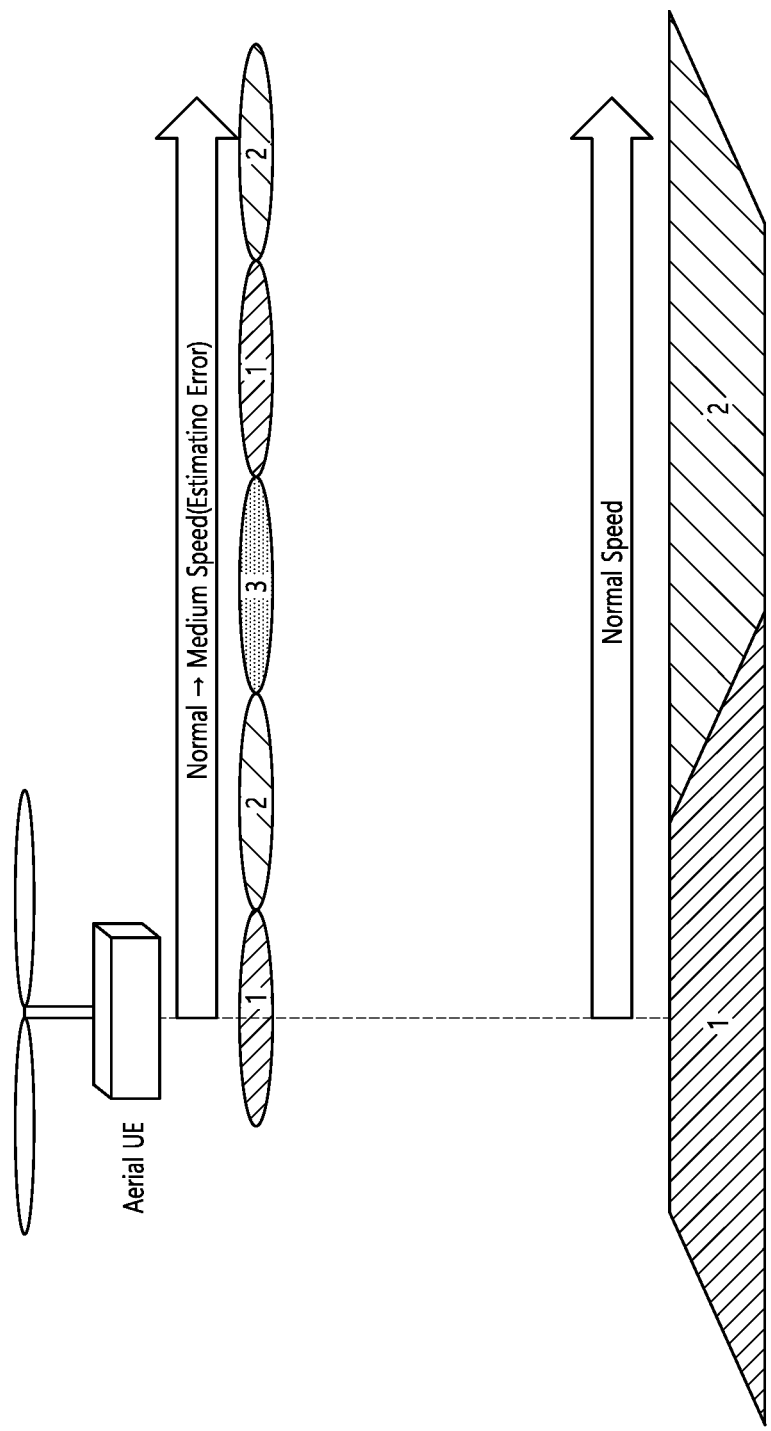
FIG. 5 shows an example of mobility state estimation according to a prior art.

FIG. 5 shows an example of mobility state estimation according to a prior art.

As shown in FIG. 5, an aerial UE experiences more frequent handover/reselection (1→2→3→1→2) than ground UE (1→2). A normal speed aerial UE is regarded as medium speed due to the frequent handover/reselection.

Meanwhile, a UE, including ground UE and aerial UE, may also perform frequent handover/reselection in heterogeneous network with pico/femto cells. The UE shall not count consecutive reselections between same two cells into mobility state detection criteria if same cell is reselected just after one other reselection. However, if more than two small cells are configured nearby, the UE would count the handover/reselection for estimating speed. The handover/reselection is considered as "not a ping-pong case" in prior art. It may also cause estimation error and applying wrong speed related parameters. Therefore, enhanced MSE algorithm is needed for correcting UE speed.

Figure 6:
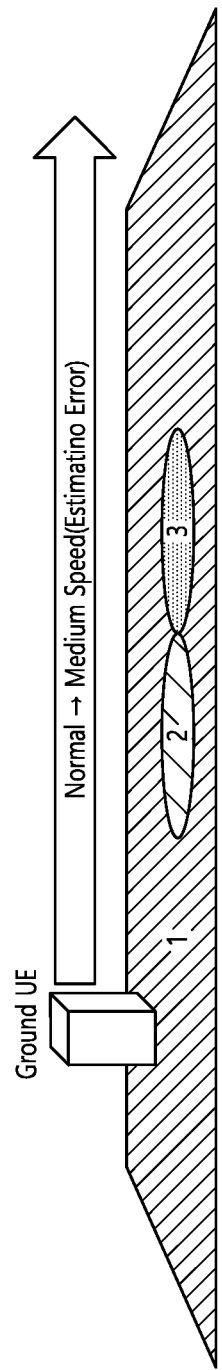
FIG. 6 shows an example of mobility state estimation according to a prior art.

FIG. 6 shows an example of mobility state estimation according to a prior art.

As shown in FIG. 6, small cells (2 and 3) are configured nearby in macro cell 1. The UE performs frequent handover/reselection (1→2→3→1). A normal speed UE is regarded as medium speed due to the frequent handover/reselection.

To solve to problem described above, a method for estimating mobility state of UE according to an embodiment of the present invention is described. In an embodiment of the present invention, the UE may be camping on a serving cell and receiving tier information from the serving cell. The UE may receive the tier information via at least one of SIB4, SIB5 and/or conditional HO candidate cell list. The tier information may be related to neighbor cells. The tier information may inform at least one tier group. The tier group may include at least one neighbor cell, and each neighbor cell may be grouped based on its distance from the serving cell. For example, a first tier group may include neighbor cells which are adjacent to the serving cell. A second tier group may include neighbor cells which are far away from the serving cell than the first tier group. In other words, neighbor cells included in the first tier group may be located closer to the serving cell than neighbor cells included in the second tier group.

In this description, a tier value may be defined. A tier value may indicate how much a neighbor cell or tier group is apart from a serving cell. For example, assuming that tier value of the serving cell is 0, tier value of a first tier group may be 1, tier value of a second tier group may be 2, and so on. According to an embodiment of the present invention, when the UE moves to a neighbor cell from a serving cell, the UE may determine whether to count the cell change based on the tier value of the neighbor cell. For example, if the tier value of the neighbor cell is a predetermined threshold or more, the UE may count the cell change. If the tier value of the neighbor cell is under the predetermined threshold, the UE may not count the cell change.

The tier information is configured based on altitude of the UE. That is, at least one the tier information may be configured, and each tier information may correspond to each range of altitude. In an embodiment of the present invention, the tier information for an aerial UE and the tier information for a ground UE are configured, respectively.

Figure 7:
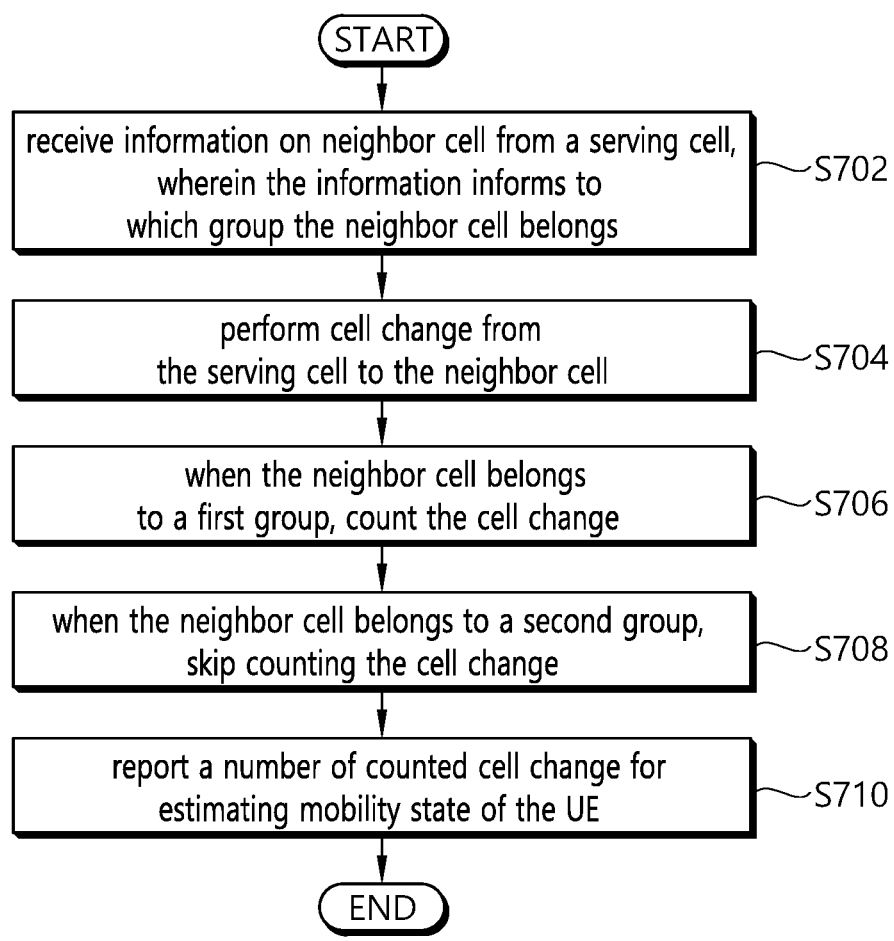
FIG. 7 shows a method for estimating mobility state of UE according to an embodiment of the present invention.

FIG. 7 shows a method for estimating mobility state of UE according to an embodiment of the present invention.

In step S702, the UE may receive information on neighbor cell from a serving cell, wherein the information informs to which group the neighbor cell belongs. The information may include a first tier value of the first group and a second tier value of the second group, and wherein the first tier value and the second tier value may be configured based on a distance from the serving cell. The first tier value may be below a threshold, and the second tier value may be equal to or above the threshold. The first group may be located closer to the serving cell than the second group. The first group and the second group may be configured based on altitude of the UE. The information may vary according to the altitude of the UE.

In step S704, the UE may perform cell change from the serving cell to the neighbor cell.

In step S706, when the neighbor cell belongs to a first group, the UE may count the cell change.

In step S708, when the neighbor cell belongs to a second group, the UE may skip counting the cell change.

In step S710, the UE may report a number of counted cell change for estimating mobility state of the UE.

Further, the UE may detect the altitude of the UE. In specific, the UE may measure a number of neighbor cells, and determine the altitude of the UE based on the number of neighbor cells. The UE may determine whether the information is related with the altitude of the UE.

Figure 8:
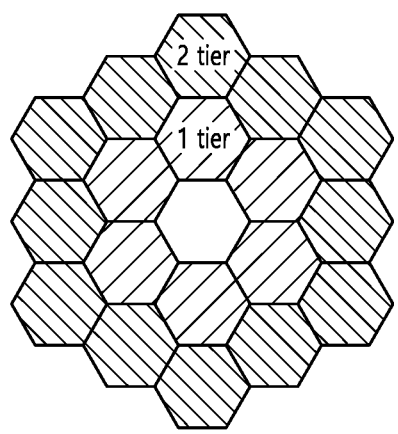
FIG. 8 shows an example of tier information according to an embodiment of the present invention.
Figure 8:
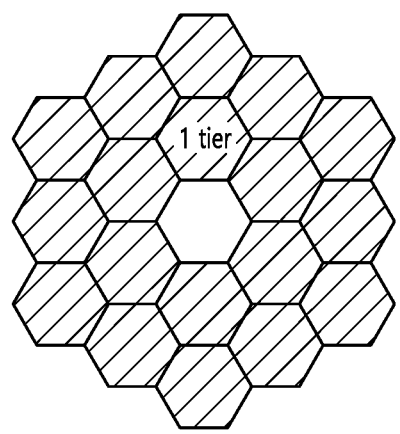
Figure 8:
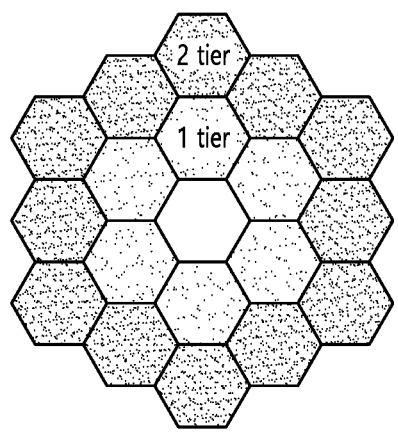
Figure 8:
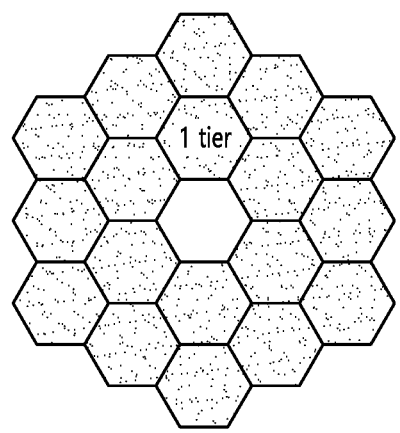

FIG. 8 shows an example of tier information according to an embodiment of the present invention. As shown in FIG. 8, the tier information for an aerial UE may be configured to include the first tier group with more neighbor cells than tier information for a ground UE. Because, in a specific area, more neighbor cells are detected at higher altitude than at lower altitude, the tier information for aerial UE may be configured to set tier groups with more neighbor cells. In other words, the aerial UE may detect a lot of neighbor cells which may be configured far from the serving cell. The UE may receive tier information of the far neighbor cells in the first tier group for aerial UE and the second tier group for ground UE, respectively.

In an example, the UE may perform cell change from the first cell to the second cell, and then cell change from the second cell to the third cell. The first cell may be a serving cell. If the third cell is included in the second tier group, the UE may consider that one cell change is performed. The cell change may be either cell reselection or handover. If the third cell is included in the first tier group, the UE may consider that no cell change is performed yet. Specifically, when the UE moves from a serving cell to another cell which is included a certain tier group, if difference between tier values of serving cell and another cell is more than 1, the UE may count the cell change. According to an embodiment of the present invention, it may be assumed that the tier value of serving cell is 0, the tier value of first tier group is 1, and the tier value of the second tier group is 2. Thus, the tier value of a certain cell may be determined based on which tier group the cell is included in.

In other words, if the tier information associated with the third cell indicates more than one tier, the UE may count the cell change from the second cell to the third cell for estimating mobility state of the UE. If the tier information associated with the third cell indicates less than or same to one tier, the UE may exclude (does not count) the cell change from the second cell to the third cell in the counting for estimating mobility state of the UE.

The tier information may be associated with specific range of altitude. The UE may select appropriate information by comparing its actual altitude and the range of altitude in tier information. The range of altitude of tier information may be appeared as a particular level or range of altitude or a particular value or range of a measured result. The particular value may be a number of detected cells or altitude.

The UE may detect its actual altitude by measuring neighbor cells. The measured result may be the number of neighbor cells of which quality is above a threshold. Or the measured result may be the number of detected neighbor cells. If the altitude of the UE corresponds to the particular level or is within the range of altitude, the UE may use the tier information for estimating mobility state of the UE. If the result measured by the UE corresponds to the particular value or is within or the range of a measured result, the UE may use the tier information for estimating mobility state of the UE.

According to embodiments of the present invention, the UE may estimate its mobility state precisely, by considering the altitude of the UE. Specifically, the UE may count cell change when the UE moves to another cell whose tier value is same to or bigger than a threshold.

Figure 9:
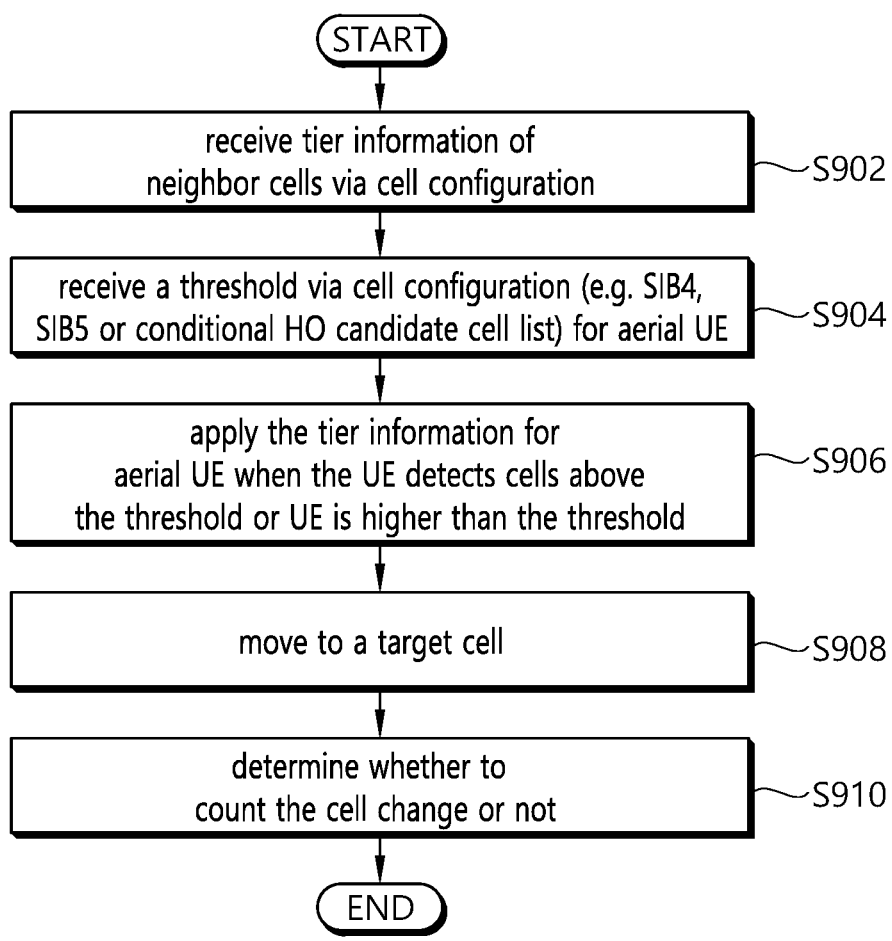
FIG. 9 shows a method for estimating mobility state of UE according to an embodiment of the present invention.

FIG. 9 shows a method for estimating mobility state of UE according to an embodiment of the present invention. In this embodiment, the UE may be an aerial UE.

In step S902, the UE may receive tier information of neighbor cells via cell configuration (e.g. SIB4, SIB5 or conditional HO candidate cell list). The tier information for aerial UE and tier information for ground UE may be configured respectively.

The UE may detect a lot of neighbor cells which may be configured far from the serving cell. The UE receives tier information of the far neighbor cells for aerial UE.

In step S904, the UE may receive a threshold via cell configuration (e.g. SIB4, SIB5 or conditional HO candidate cell list) for aerial UE. The threshold may be a number of detected cells or altitude.

In step S906, the UE may apply the tier information for aerial UE when the UE detects cells above the threshold or UE is higher than the threshold.

The aerial UE may not perform frequent reselection/handover when the altitude of UE is low. Therefore, tier information may be adapted differently for UEs at different altitude. In this embodiment, the tier information may include information for aerial UE, e.g. "tierForAerial", and information for ground UE, e.g. "tierForGround". If the aerial UE goes up and exceeds predefined altitude threshold or finds more than predefined number of detected cells, the aerial UE may start to apply "tierForAerial". The UE may apply "tierForGround" before it exceeds the threshold. If the UE has not received the "tierForGround", it would perform as legacy. The UE may receive predefined threshold as following format as an example.

According to an embodiment of the present invention, SIB4, SIB 5 and conditional HO candidate cell list may be modified as table 1, 2 and 3, respectively.

TABLE 1

| | |
|---|---|
| IntraFreqNeighCellList ::= | SEQUENCE (SIZE (1..maxCellIntra)) OF IntraFreqNeighCellInfo |
| IntraFreqNeighCellInfo ::= | SEQUENCE { |
| phyCellId | PhysCellId, |
| q-OffetCell | Q-OffetRange, |
| tierForGround | INTEGER(1..maxTeir), |
| tierForAerial | INTEGER(1..maxTeir), |
| tierThresNumNeigh | INTEGER{1..16}, |
| tierThresAltitude | OCTET STRING, |
| ... | |
| } | |

Table 1 shows IE of SIB4 according to an embodiment of the present invention. "tierForGround" may inform information on tier groups for ground UE, e.g. low altitude UE. "tierForAerial" may inform information on tier groups for aerial UE, e.g. high altitude UE. "tierThresNumNeigh" may inform threshold of the number of detected neighbor cells related to the altitude of the UE. "tierThresAltitude" may inform threshold of altitude.

TABLE 2

| | |
|---|---|
| InterFreqNeighCellList ::= | SEQUENCE (SIZE (1..maxCellInter)) OF InterFreqNeighCellInfo |
| InterFreqNeighCellInfo ::= | SEQUENCE { |
| phyCellId | PhysCellId, |
| q-OffetCell | Q-OffetRange, |
| tierForGround | INTEGER(1..maxTeir), |
| tierForAerial | INTEGER(1..maxTeir), |
| tierThresNumNeigh | INTEGER{1..16}, |
| tierThresAltitude | OCTET STRING, |
| ... | |
| } | |

?

Table 2 shows IE of SIB5 according to an embodiment of the present invention. "tierForGround" may inform information on tier groups for ground UE, e.g. low altitude UE. "tierForAerial" may inform information on tier groups for aerial UE, e.g. high altitude UE. "tierThresNumNeigh" may inform threshold of the number of detected neighbor cells related to the altitude of the UE. "tierThresAltitude" may inform threshold of altitude.

TABLE 3

```
CandidateCellInfoList-r10 ::=   SEQUENCE (SIZE (1..maxFreq)) OF CandidateCellInfo-r10
CandidateCellInfo-r10 ::-       SEQUENCE {
  -- cellIdentification
  physCellId-r10                PhysCellId,
  dl-CarrierFreq-r10              ARFCN-ValueEUTRA,
  tierForGround                   INTEGER(1..maxTier),
  tierForAerial                   INTEGER(1..maxTier),
  tierThresNumNeigh               INTEGER(1..16),
  tierThresAltitude               OCTET STRING,
  -- available measurement results
  rsrpResult-r10                RSRP-Range                    OPTIONAL,
  rsrqResult-r10                RSRQ-Rauge                    OPTIONAL,
  [ [ dl-CarrierFreq-v1090        ARFCN-ValueEUTRA-v9e0       OPTIONAL
  ] ],
  [ [ rsrqResult-v1250          RSRQ-Range-v1250              OPTIONAL
  ] ],
  [ [ rs-sinr-Result-r13        RS-SINR-Range-r13             OPTIONAL
  ] ]
}
```

Table 3 shows IE of RRM-config information element according to an embodiment of the present invention. "tierForGround" may inform information on tier groups for ground UE, e.g. low altitude UE. "tierForAerial" may inform information on tier groups for aerial UE, e.g. high altitude UE. "tierThresNumNeigh" may inform threshold of the number of detected neighbor cells related to the altitude of the UE. "tierThresAltitude" may inform threshold of altitude.

In step S908, the UE may move to a target cell.

In step S910, the UE may determine whether to count the cell change or not. Specifically, the UE may not count the reselection/handover to the target cell, when difference between the tier value of target cell and the tier value of previous serving cell is below a predetermined threshold. The UE may count the reselection/handover to the target cell, when difference between the tier value of target cell and the tier value of previous serving cell is same to or above a predetermined threshold.

In addition, if the target cell is not configured in neighbor cell list of previous serving cell, UE may count the reselection/handover to the target cell for MSE after the reselection/handover is completed.

Figure 10:
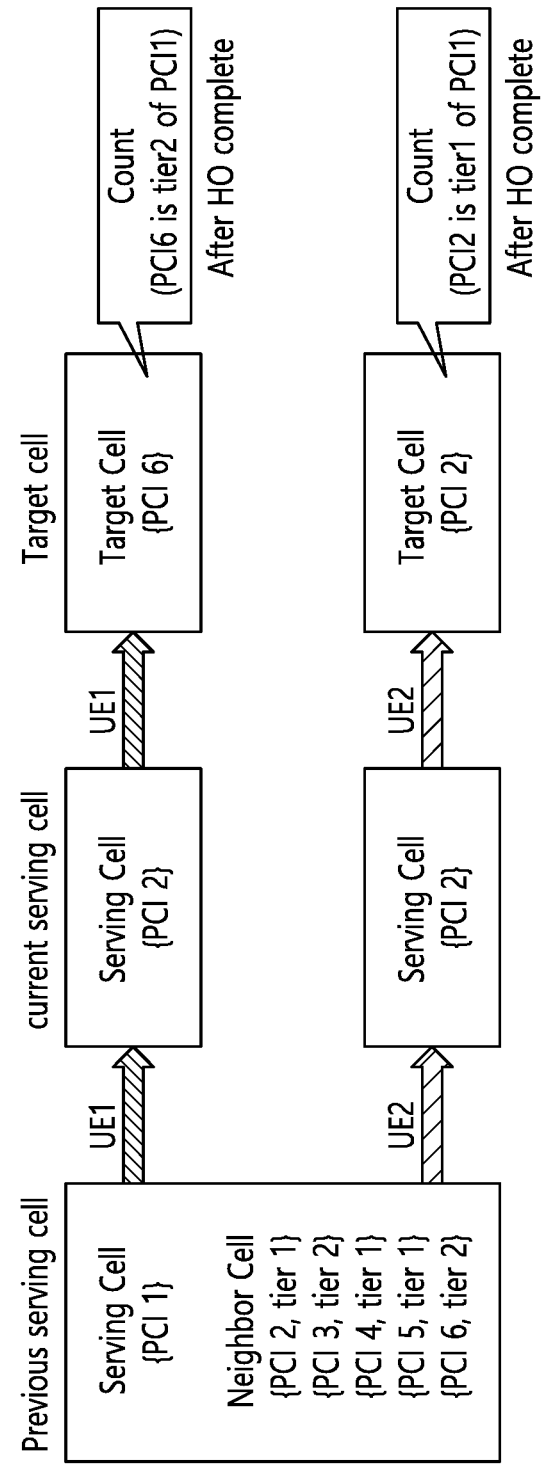
FIG. 10 shows an example of enhanced MSE using tier according to an embodiment of the present invention.

FIG. 10 shows an example of enhanced MSE using tier according to an embodiment of the present invention.

The UE may determine whether to count cell change or not based on difference between tier value of serving cell and tier value of target cell. If the difference is above or same to a predefined threshold, the UE may count the cell change to target cell. Unless, the UE may not count the cell change to target cell. The predefined threshold of tier value may be, for example, 2.

Specifically, the UE 1 may be camped on PCI 2 and start handover/reselection to target cell PCI 6. In this case, the UE may count the handover/reselection after the handover/reselection is completed because the PCI 6 is tier 2, of PCI 1 which was previous serving cell. Tier 2 means that the difference between the tier values of serving cell and the target cell is 2.

On the other hand, UE 2 may be camped on the PCI 4 and start handover/reselection to target cell PCI 2. In this case, UE may not count the handover/reselection after the handover/reselection is completed because the PCI 2 is tier1 of PCI 1 which was previous serving cell. Tier 1 means that the difference between the tier values of serving cell and the target cell is 1. If the target cell is PCI 7 which was not configured in neighbor list of previous serving cell, UE may count the handover/reselection after the handover/reselection would be completed. After handover/reselection is completed, the target cell may become a new serving cell and serving cell becomes previous serving cell. In the same way, if the next target cell is 1 tier of previous serving cell which was current serving cell, UE does not count the reselection/handover for MSE.

Figure 11:
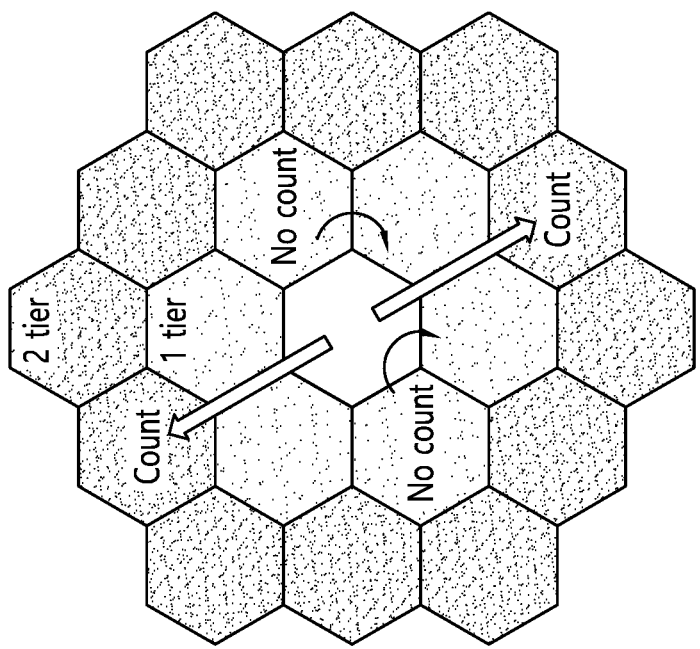
FIG. 11 shows an example of estimating mobility state according to an embodiment of the present invention.
Figure 11:
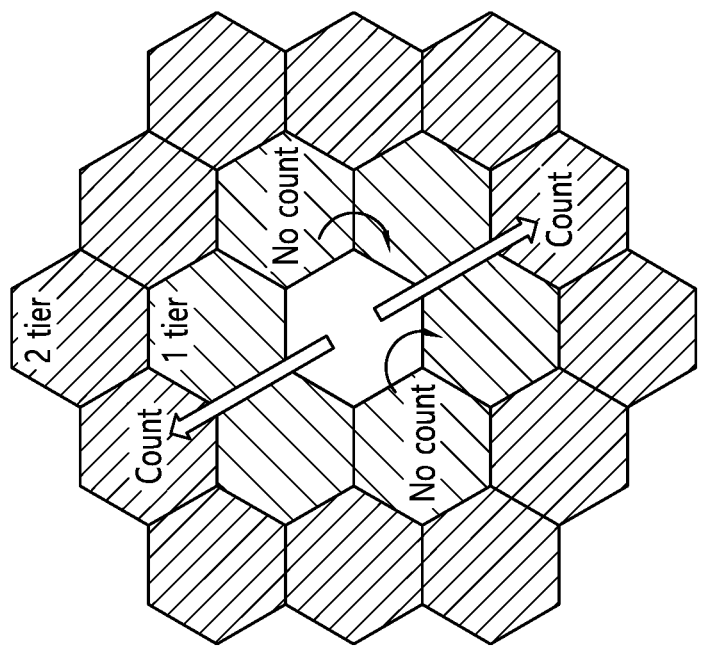

FIG. 11 shows an example of estimating mobility state according to an embodiment of the present invention.

If UE applies the algorithm, the UE may not count handover/reselection within 1 tier. Therefore, the estimation error of UE speed would be reduced and the speed scaling parameter would be applied accurately. Especially, aerial UE which detects a lot of neighbor cell may correct the estimation error with the MSE algorithm.

Figure 12:
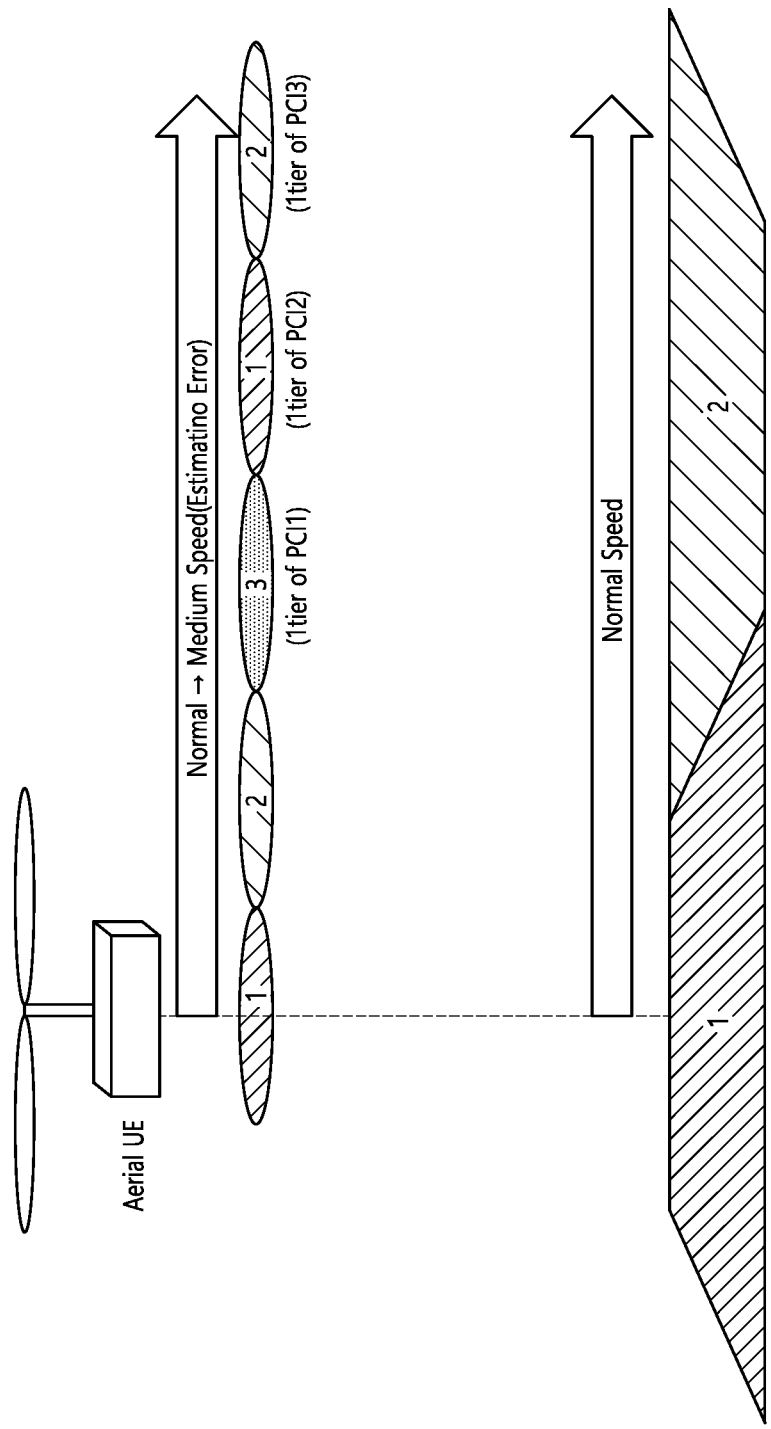
FIG. 12 shows an example of estimating mobility state of an aerial UE according to an embodiment of the present invention.

FIG. 12 shows an example of estimating mobility state of an aerial UE according to an embodiment of the present invention. As shown in FIG. 11, the UE may determine its mobility state as normal speed, because the UE did not enter a cell whose tier value same or bigger than a threshold, for example 2.

Figure 13:
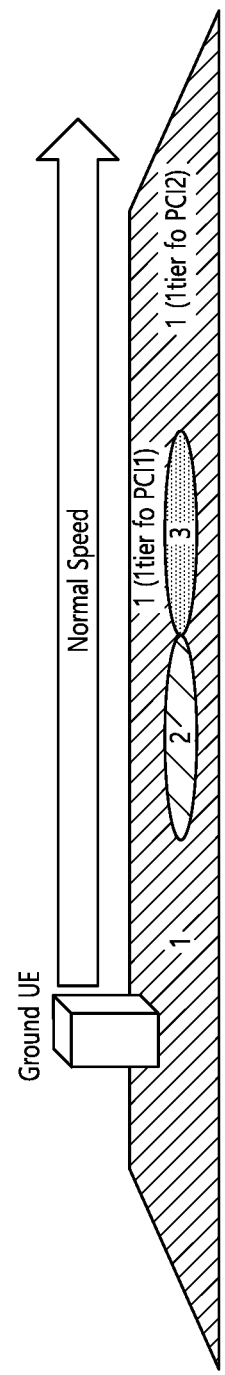
FIG. 13 shows an example of estimating mobility state of a ground UE according to an embodiment of the present invention.

FIG. 13 shows an example of estimating mobility state of a ground UE according to an embodiment of the present invention. As shown in FIG. 12, the UE may determine its mobility state as normal speed, because the UE did not enter a cell whose tier value same or bigger than a threshold, for example 2. The algorithm according to the embodiment of the present invention may also correct the estimation error in heterogeneous network.

According to embodiments of the present invention, the UE may estimate its mobility state precisely, by considering the altitude of the UE. Specifically, the UE may count cell change when the UE moves to another cell whose tier value is same to or bigger than a threshold.

Figure 14:
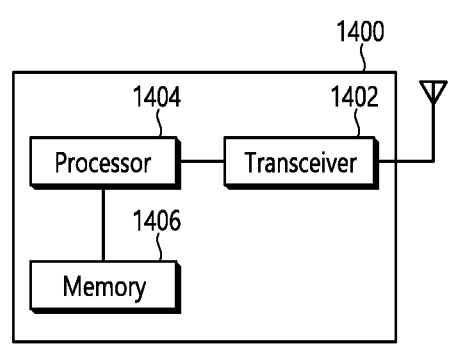
FIG. 14 shows a structure of UE according to an embodiment of the present invention.

FIG. 14 shows a structure of UE according to an embodiment of the present invention.

According to an embodiment of the present invention, the UE 1400 may comprise transceiver 1402, processor 1404 and memory 1406. The memory 1406 is coupled to the processor 1404, and stores a variety of information for driving the processor 1404. The transceiver 1402 is coupled to the processor 1404, and transmits and/or receives a radio signal. The processor 1404 implements the proposed functions, procedures, and/or methods. In the aforementioned embodiments, an operation of the UE 1400 may be implemented by the processor 1404.

The processor 1404 may include application-specific integrated circuit (ASIC), other chipset, logic circuit and/or data processing device. The memory 1406 may include read-only memory (ROM), random access memory (RAM), flash memory, memory card, storage medium and/or other storage device. The transceiver 1402 may include baseband circuitry to process radio frequency signals. When the embodiments are implemented in software, the techniques described herein can be implemented with modules (e.g., procedures, functions, and so on) that perform the functions described herein. The modules can be stored in memories and executed by processor 1404. The memory 1406 can be implemented within the processor 1404 or external to the processor 1404 in which case those can be communicatively coupled to the processor 1404 via various means as is known in the art.

The processor 1404 may control the transceiver 1402 to receive information on neighbor cell from a serving cell, wherein the information informs to which group the neighbor cell belongs. The information may include a first tier value of the first group and a second tier value of the second group, and wherein the first tier value and the second tier value may be configured based on a distance from the serving cell. The first tier value may be below a threshold, and the second tier value may be equal to or above the threshold. The first group may be located closer to the serving cell than the second group. The first group and the second group may be configured based on altitude of the UE. The information may vary according to the altitude of the UE.

The processor 1404 may perform cell change from the serving cell to the neighbor cell.

When the neighbor cell belongs to a first group, the processor 1404 may count the cell change.

When the neighbor cell belongs to a second group, the processor 1404 may skip counting the cell change.

The processor 1404 may report a number of counted cell change for estimating mobility state of the UE.

Further, the processor 1404 may detect the altitude of the UE. In specific, the processor 1404 may measure a number of neighbor cells, and determine the altitude of the UE based on the number of neighbor cells. The processor 1404 may determine whether the information is related with the altitude of the UE.

According to embodiments of the present invention, the UE may estimate its mobility state precisely, by considering the altitude of the UE. Specifically, the UE may count cell change when the UE moves to another cell whose tier value is same to or bigger than a threshold.

Figure 15:
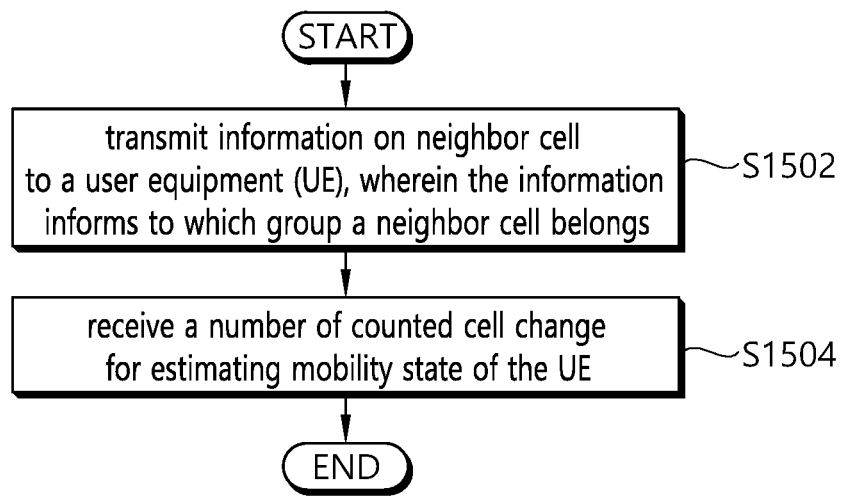
FIG. 15 shows an example of a method for estimating mobility state of UE according to an embodiment of the present invention.

FIG. 15 shows an example of a method for estimating mobility state of UE according to an embodiment of the present invention. In this embodiment, a base station (BS) may be at least one of eNB or gNB.

In step S1502, the BS may transmit information on neighbor cell to a user equipment (UE), wherein the information informs to which group a neighbor cell belongs. The first group may be located closer to the serving cell than the second group. The information may include a first tier value of the first group and a second tier value of the second group. The first tier value and the second tier value may be configured based on a distance from the serving cell. The first tier value may be below a threshold, and the second tier value may be equal to or above the threshold. The first group and the second group may be configured based on altitude of the UE. The information may vary according to the altitude of the UE.

In step S1504, the BS may receive a number of counted cell change for estimating mobility state of the UE. A number of counted cell change may be determined based on whether the neighbor cell belongs to a first group or a second group, when the UE performs cell change from a serving cell to the neighbor cell. The cell change may be counted when the neighbor cell belongs to the second group. The BS which receives the number of counted cell change may be same with or different from the BS in step S1502.

Figure 16:
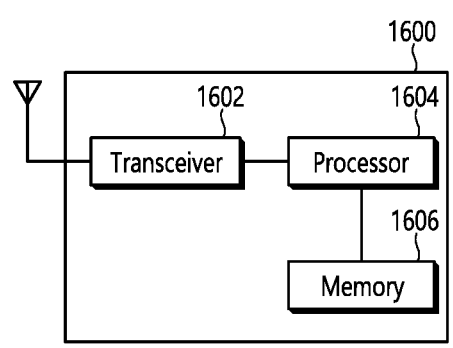
FIG. 16 shows a structure of network according to an embodiment of the present invention.

FIG. 16 shows a structure of network according to an embodiment of the present invention. In this embodiment, a base station (BS) 1600 may be at least one of eNB or gNB, and also may be referred as a serving cell.

According to an embodiment of the present invention, the BS 1600 may comprise transceiver 1602, processor 1604 and memory 1606. The memory 1606 is coupled to the processor 1604, and stores a variety of information for driving the processor 1604. The transceiver 1602 is coupled to the processor 1604, and transmits and/or receives a radio signal. The processor 1604 implements the proposed functions, procedures, and/or methods. In the aforementioned embodiments, an operation of the BS 1600 may be implemented by the processor 1604.

The processor 1604 may include application-specific integrated circuit (ASIC), other chipset, logic circuit and/or data processing device. The memory 1606 may include read-only memory (ROM), random access memory (RAM), flash memory, memory card, storage medium and/or other storage device. The transceiver 1602 may include baseband circuitry to process radio frequency signals. When the embodiments are implemented in software, the techniques described herein can be implemented with modules (e.g., procedures, functions, and so on) that perform the functions described herein. The modules can be stored in memory 1606 and executed by processor 1604. The memory 1606 can be implemented within the processor 1604 or external to the processor 1604 in which case those can be communicatively coupled to the processor 1604 via various means as is known in the art.

The processor 1604 may control the transceiver 1602 to transmit information on neighbor cell to a user equipment (UE), wherein the information informs to which group a neighbor cell belongs. The first group may be located closer to the serving cell than the second group. The information may include a first tier value of the first group and a second tier value of the second group. The first tier value and the second tier value may be configured based on a distance from the serving cell. The first tier value may be below a threshold, and the second tier value may be equal to or above the threshold. The first group and the second group may be configured based on altitude of the UE. The information may vary according to the altitude of the UE.

The processor 1604 may control the transceiver 1602 to receive a number of counted cell change for estimating mobility state of the UE. A number of counted cell change may be determined based on whether the neighbor cell belongs to a first group or a second group, when the UE performs cell change from a serving cell to the neighbor cell. The cell change may be counted when the neighbor cell belongs to the second group.

According to embodiments of the present invention, the UE may estimate its mobility state precisely, by considering the altitude of the UE. Specifically, the UE may count cell change when the UE moves to another cell whose tier value is same to or bigger than a threshold.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A,B,C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) operating in a wireless communication system, the method comprising:
   camping on a first cell;
   receiving, from the first cell, information related to neighbor cells including a second cell and a third cell,
   wherein the information related to the neighbor cells includes tier information for the neighbor cells that is configured for an aerial UE and a ground UE, respectively;
   performing a first cell change from the first cell to the second cell;
   counting the first cell change for estimating a mobility state of the UE;
   performing a second cell change from the second cell to the third cell;
   estimating the mobility state of the UE based on i) the counted first cell change and ii) whether the second cell change is counted or not according to the tier information for the neighbor cells that is configured for the aerial UE, based on the UE being the aerial UE but not being the ground UE,
   wherein the second cell change is counted based on the information related to the third cell informing that the third cell belongs to a second tier different from a first tier to which the second cell belongs,
   wherein the second cell change is not counted based on the information related to the third cell informing that the third cell belongs to the first tier to which the second cell belongs,
   wherein the mobility state of the UE is estimated as a medium-mobility state based on number of cell reselections during time period $T_{CRmax}$ exceeding a neighbor cell reselection medium-mobility state count value ($N_{CR\_M}$) and not exceeding a neighbor cell reselection high-mobility state count value ($N_{CR\_H}$),
   wherein the mobility state of the UE is estimated as a high-mobility state based on the number of cell reselections during the time period TCRmax exceeding NCR_H,
   applying a speed dependent scaling rule based on the mobility state of the UE being estimated as the medium-mobility state or the high-mobility state,
   wherein the first tier includes at least one neighbor cell surrounding the first cell,
   wherein the second tier includes at least one neighbor cell surrounding the at least one neighbor cell from the first tier, and
   wherein the tier information configured for the aerial UE includes more neighbor cells than the tier information configured for the ground UE.

2. The method of claim 1, wherein the information related to the neighbor cells includes a threshold for which the tier information is applied.

3. The method of claim 2,
   wherein the threshold is related to an altitude of the UE, and
   wherein the tier information is applied based on the altitude of the UE being higher than the threshold.

4. The method of claim 2,
   wherein the threshold is related to a number of detected neighbor cells, and
   wherein the tier information is applied based on the number of detected neighbor cells being above the threshold.

5. The method of claim 1, wherein the UE is in communication with at least one of a mobile device, a network, and/or autonomous vehicles other than the UE.

6. A user equipment (UE) configured to operate in a wireless communication system, the UE comprising:
   a transceiver;
   a processor; and
   a memory operably connectable to the processor and storing instructions that, based on being executed by the processor, perform operations comprising:
   camping on a first cell;
   receiving, from the first cell using the transceiver, information related to neighbor cells including a second cell and a third cell,
   wherein the information related to the neighbor cells includes tier information for the neighbor cells that is configured for an aerial UE and a ground UE, respectively;
   performing a first cell change from the first cell to the second cell;
   counting the first cell change for estimating a mobility state of the UE;
   performing a second cell change from the second cell to the third cell;
   estimating the mobility state of the UE based on i) the counted first cell change and ii) whether the second cell change is counted or not according to the tier information for the neighbor cells that is configured for the aerial UE, based on the UE being the aerial UE but not being the ground UE, wherein the second cell change is counted based on the information related to the third cell informing that the third cell belongs to a second tier different from a first tier to which the second cell belongs, wherein the second cell change is not counted based on the information related to the third cell informing that the third cell belongs to the first tier to which the second cell belongs, wherein the mobility state of the UE is estimated as a medium-mobility state based on number of cell reselections during time period $T_{CRmax}$ exceeding a neighbor cell reselection medium-mobility state count value ($N_{CR\_M}$) and not exceeding a neighbor cell reselection high-mobility state count value ($N_{CR\_H}$), wherein the mobility state of the UE is estimated as a high-mobility state based on number of cell reselections during the time period TCRmax exceeding $N_{CR\_H}$, applying a speed dependent scaling rule based on the mobility state of the UE being estimated as the medium-mobility state or the high-mobility state, wherein the first tier includes at least one neighbor cell surrounding the at least one neighbor cell from the first cell, wherein the second tier includes at least one neighbor cell surrounding the first tier, and wherein the tier information configured for the aerial UE includes more neighbor cells than the tier information configured for the ground UE.

7. The UE of claim 6, wherein the information related to the neighbor cells includes a threshold for which the tier information is applied.

8. The UE of claim 7, wherein the threshold is related to an altitude of the UE, and wherein the tier information is applied based on the altitude of the UE being higher than the threshold.

9. The UE of claim 7, wherein the threshold is related to a number of detected neighbor cells, and wherein the tier information is applied based on the number of detected neighbor cells being above the threshold.

10. A processing apparatus operating in a wireless communication system, the apparatus comprising:

a processor; and a memory operably connectable to the at least one processor, wherein the processor is configured to perform operations comprising:

obtaining, from a first cell, information related to neighbor cells including a second cell and a third cell, wherein the information related to the neighbor cells includes tier information for the neighbor cells that is configured for an aerial UE and a ground UE, respectively;

performing a first cell change from the first cell to the second cell;

counting the first cell change for estimating a mobility state of the UE;

performing a second cell change from the second cell to the third cell;

estimating the mobility state of the UE based on i) the counted first cell change and ii) whether the second cell change is counted or not according to the tier information for the neighbor cell that is configured for the aerial UE, based on the UE being the aerial UE but not being the ground UE, wherein the second cell change is counted based on the information related to the third cell informing that the third cell belongs to a second tier different from a first tier to which the second cell belongs, wherein the second cell change is not counted based on the information related to the third cell informing that the third cell belongs to the first tier to which the second cell belongs, wherein the mobility state of the UE is estimated as a medium-mobility state based on number of cell reselections during time period $T_{CRmax}$ exceeding a neighbor cell reselection medium-mobility state count value ($N_{CR\_M}$) and not exceeding a neighbor cell reselection high-mobility state count value ($N_{CR\_H}$), wherein the mobility state of the UE is estimated as a high-mobility state based on number of cell reselections during the time period TCRmax exceeding NCR_H, applying a speed dependent scaling rule based on the mobility state of the UE being estimated as the medium-mobility state or the high-mobility state, wherein the first tier includes at least one neighbor cell surrounding the first cell, wherein the second tier includes at least one neighbor cell surrounding the at least one neighbor cell from the first tier, and wherein the tier information configured for the aerial UE includes more neighbor cells than the tier information configured for the ground UE.

* * * * *